(12) United States Patent
Teng et al.

(10) Patent No.: US 7,156,548 B2
(45) Date of Patent: Jan. 2, 2007

(54) LIGHT GUIDE PLATE WITH V-SHAPED GROOVES AND BACKLIGHT MODULE INCORPORATING SAME

(75) Inventors: Ching-Hung Teng, Miao-Li (TW); Chiu-Lien Yang, Miao-Li (TW); Jia-Pang Pang, Miao-Li (TW)

(73) Assignee: Innolux Display Corp., Miao-Li (TW)

( * ) Notice: Subject to any disclaimer, the term of this patent is extended or adjusted under 35 U.S.C. 154(b) by 53 days.

(21) Appl. No.: 11/120,528

(22) Filed: May 2, 2005

(65) Prior Publication Data

US 2005/0243574 A1 Nov. 3, 2005

(30) Foreign Application Priority Data

Apr. 30, 2004 (TW) ............................... 93112188 A

(51) Int. Cl.
*F21V 8/00* (2006.01)
(52) U.S. Cl. ...................................... 362/625; 362/623
(58) Field of Classification Search .................. 362/31, 362/601, 623, 625, 626
See application file for complete search history.

(56) References Cited

U.S. PATENT DOCUMENTS 6,845,212 B1 * 1/2005 Gardiner et al. ............ 385/146
7,046,905 B1 * 5/2006 Gardiner et al. ............ 385/146
2002/0051355 A1 * 5/2002 Egawa et al. ................. 362/31
2002/0080598 A1 * 6/2002 Parker et al. ................. 362/31
2003/0090888 A1 * 5/2003 Mizutani et al. ............. 362/31

FOREIGN PATENT DOCUMENTS

JP   2004-111384   4/2004

* cited by examiner

*Primary Examiner*—Laura K. Tso
(74) *Attorney, Agent, or Firm*—Wei Te Chung

(57) ABSTRACT

A light guide plate (10) of a preferred embodiment includes: an incident surface (12) for receiving incident light beams from a corresponding light source; an emitting surface (16); and a bottom surface (11) opposite to the emitting surface. The bottom surface defines a plurality of V-shaped grooves. A side (17) of each V-shaped groove is a curved surface, and at least one part of the curved surface is wave-shaped. The light guide plate can improve the utilization of light beams, reduce wastage of light beams and configure the uniformity of luminance.

20 Claims, 6 Drawing Sheets

LIGHT GUIDE PLATE WITH V-SHAPED GROOVES AND BACKLIGHT MODULE INCORPORATING SAME

BACKGROUND OF THE INVENTION

1. Field of the Invention

The present invention relates to a light guide plate employed in a backlight module, and particularly to a light guide plate having V-shaped grooves configured for high and uniform brightness.

2. Description of Related Art

Because a liquid crystal display (LCD) device has the merits of being thin, light in weight, and drivable by a low voltage, it is extensively employed in various electronic devices.

A liquid crystal panel of an LCD device cannot itself emit light beams. Therefore a typical liquid crystal panel uses a backlight module to provide the needed illumination. The backlight module has a light source and a light guide plate. The light source emits the light beams to the light guide plate, which then transmits the light beams to illuminate liquid crystal panel.

Referring to FIG. 14, one kind of typical backlight module is shown. The backlight module 1 comprises a light guide plate 2 and a light source 3. The light guide plate 2 has a bottom surface 5 and an emitting surface 4. The light source 3 is set adjacent one corner of the light guide plate 2. A plurality of parallel, V-shaped grooves 6 is defined at the bottom surface 5. The V-shaped grooves 6 are arc-shaped. For each V-shaped groove 6, every point along an apex of the V-shaped groove 6 is substantially equidistant from the light source 3. The V-shaped grooves 6 all have a same width and a same height. More particularly, a density of the V-shaped grooves 6 is uniform in a direction away from the light source 3.

When light beams from the light source 3 strike surfaces of the light guide plate 2 at the V-shaped grooves 6, the incident angles of the light beams differ according to the heights at which the light beams reach the V-shaped grooves 6. In other words, some incident angles are relatively large and some incident angles are relatively small.

When the incident angles are large, the light beams typically are reflected from the surface at the V-shaped groove 6, whereupon the light beams emit from the emitting surface 4. Such light beams are not refracted at the surface.

In contrast, when the incident angles are small, the light beams typically are reflected and also refracted from the surface at the V-groove 6. The refracted light beams are wasted. Thus the overall utilization of light beams by the light guide plate is lowered, and illumination provided by the emitting surface 4 is liable to be non-uniform.

It is desired to provide a new light guide plate and a corresponding backlight module which overcome the above-described problems.

SUMMARY OF THE INVENTION

In one embodiment, a light guide plate comprises: an incident surface for receiving incident light beams from a corresponding light source; an emitting surface; and a bottom surface opposite to the emitting surface. The bottom surface defines a plurality of V-shaped grooves. A side of each V-shaped groove defines a curved surface, and at least one part of the curved surface is wave-shaped.

Because a side of each V-shaped groove is a curved surface, and at least one part of the curved surface is wave-shaped, when the light beams come to the V-shaped groove, the incident angles are different. By configuring the bending of the curved side of the V-shaped groove, the light guide plate can configure the incident angle, and make the incident angle is enough big, and make the light beams reflected from the side and not refracted. Thus, the utilization of the light beams is improved.

Other objects, advantages, and novel features will become more apparent from the following detailed description when taken in conjunction with the accompanying drawings.

DETAILED DESCRIPTION OF THE PRESENT INVENTION

Figure 1:
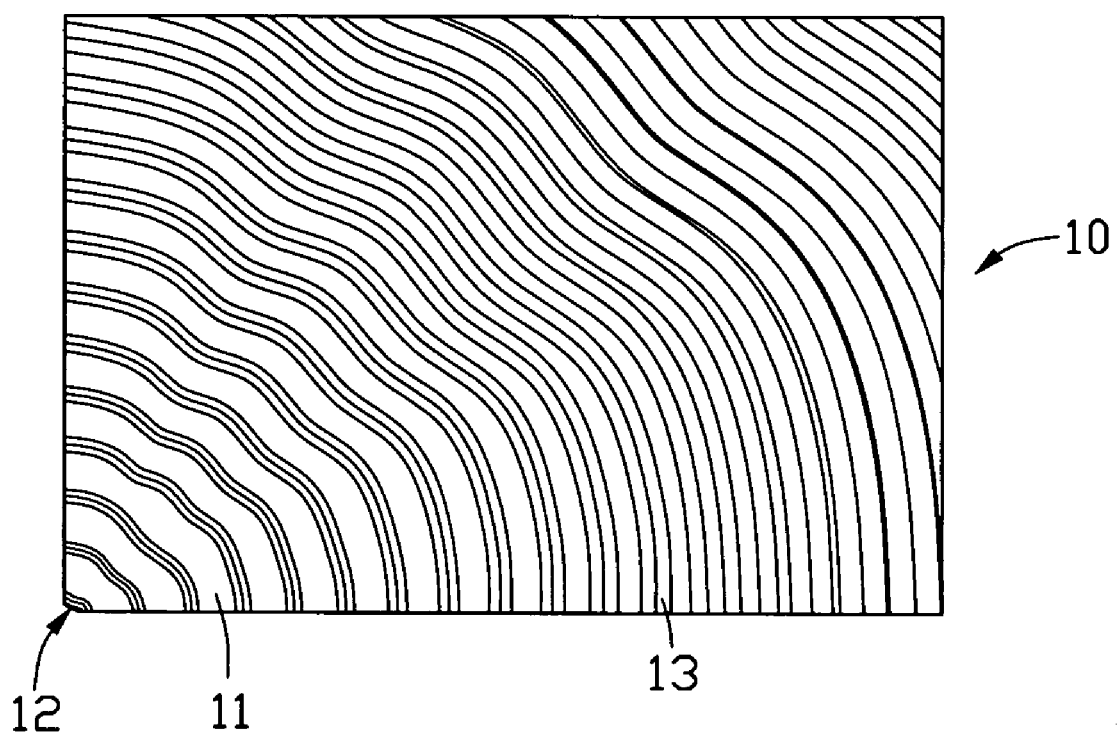
FIG. 1 is a bottom plan view of a light guide plate according to a first embodiment of the present invention.
Figure 2:
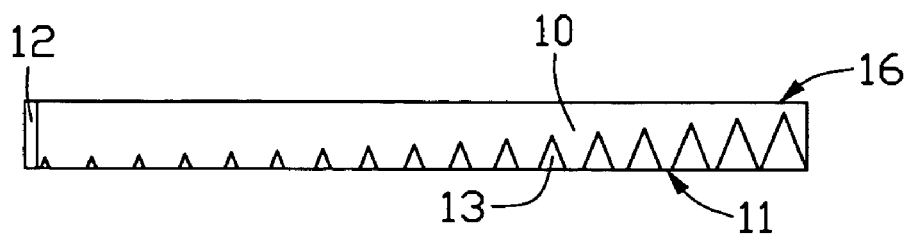
FIG. 2 is a side plan view of the light guide plate of FIG. 1.

Referring to FIG. 1 and FIG. 2, a light guide plate 10 according to the first embodiment of the present invention is shown. The light guide plate 10 includes an incident surface 12, a bottom surface 11, and an emitting surface 16. The incident surface 12 is at a corner of the light guide plate 10, and adjoins the bottom surface 11. The emitting surface 16 is opposite to the bottom surface 11. The bottom surface 11 has a plurality of parallel, V-shaped grooves 13. The V-shaped grooves 13 become progressively more densely arranged along a direction away the incident surface 12. In addition, heights of the V-shaped grooves 13 become progressively greater along a direction away the incident surface 12.

Figure 3:
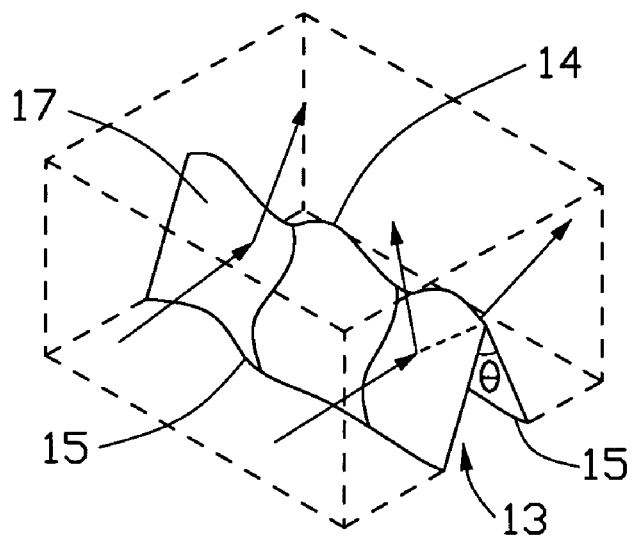
FIG. 3 is a schematic, enlarged, isometric view of part of a V-shaped groove of the light guide plate of FIG. 1.
Figure 4:
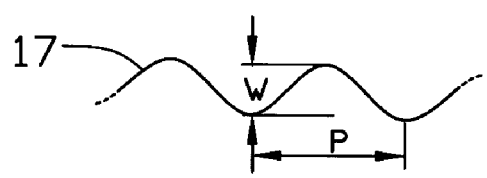
FIG. 4 is a schematic, cross-sectional view of part of an inside surface of the light guide plate defined by the V-shaped groove of FIG. 3.
Figure 5:
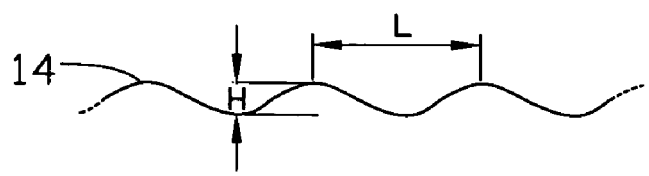
FIG. 5 is a schematic, side plan view of part of a top line defined by the V-shaped groove of FIG. 3.

Referring to FIG. 3 through FIG. 5, part of a V-shaped groove 13 according to the first embodiment is shown. Each V-shaped groove 13 defines two sides 17, a top line 14 where the sides 17 intersect, two bottom lines 15 at bottom extremities of the sides 17 respectively, and an angle θ between the sides 17. Each side 17 of the V-shaped groove 13 has a curved surface, and at least one part of the curved surface is wave-shaped. In a simple exemplary embodiment, the entire curved surface is wave-shaped. The wave-shaped surface defines a depth W and a wavelength P. The top line 14 of the V-shaped groove 13 is a wave-shaped line, which defines a depth H and a wavelength L. Each bottom line 15 is also a wave-shaped line.

In use, by configuring either or both of the depth W and the wavelength P of any side 17 of the V-shaped groove 13, the size of the angle θ of the V-shaped groove 13 can be configured accordingly. This in turn determines the incident angle of a light beam striking the side 17. If the incident angle is large enough, then the light beam can be reflected by the side 17 instead of being refracted. This technique improves the utilization of light beams by the light guide plate 10, and reduces wastage of light beams.

By configuring either or both of the depth H and the wavelength L of the top line 14, the uniformity of luminance of the light guide plate 10 can be configured accordingly. In particular, it is desirable that the depths H of the V-shaped grooves 13 progressively increase in a direction away the incident surface 12, such that the heights of the V-shaped grooves 13 progressively increase in a direction away from the incident surface 12. In this way, a density of the V-shaped grooves 13 can progressively increase in a direction away from the incident surface 12. Thus the light guide plate 10 can provide uniform luminance.

Figure 6:
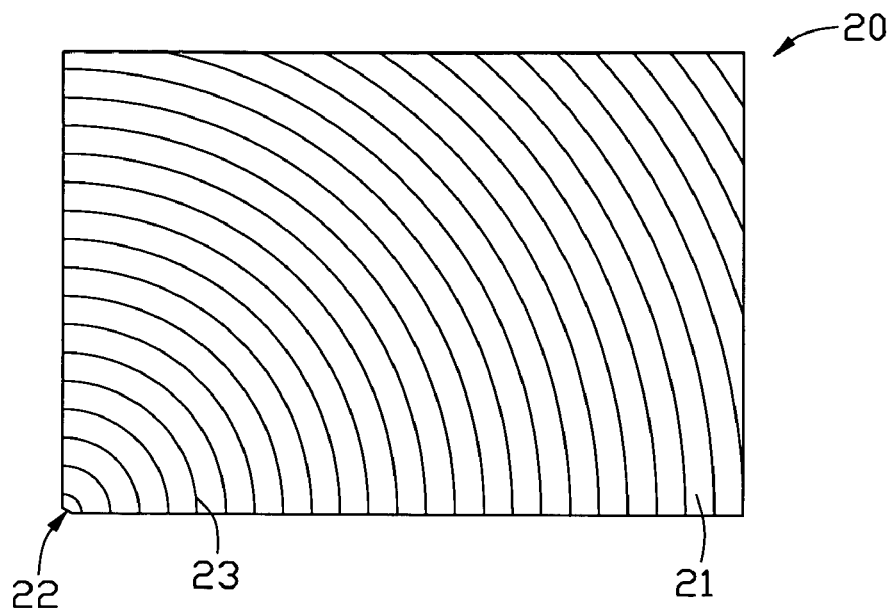
FIG. 6 is a bottom plan view of a light guide plate according to a second embodiment of the present invention.
Figure 7:
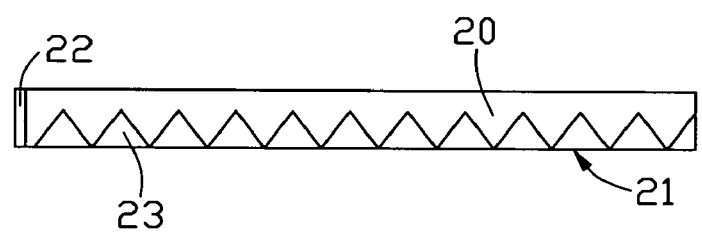
FIG. 7 is a side plan view of the light guide plate of FIG. 6.

Referring to FIG. 6 and FIG. 7, a light guide plate 20 according to the second embodiment of the present invention is shown. The light guide plate 20 has an incident surface 22 and a bottom surface 21. The incident surface 22 is at a corner of the light guide plate 20. The bottom surface 21 has a plurality of parallel, V-shaped grooves 23. The V-shaped grooves 23 are arc-shaped. For each V-shaped groove 23, every point along an apex of the V-shaped groove 23 is substantially equidistant from the incident surface 22. The V-shaped grooves 23 all have a same width and a same height. More particularly, a density of the V-shaped grooves 23 is uniform in a direction away from the incident surface 22.

Figure 8:
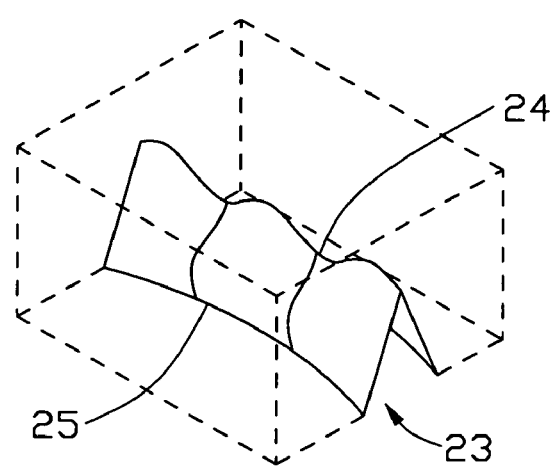
FIG. 8 is a schematic, enlarged, isometric view of part of a V-shaped groove of the light guide plate of FIG. 6.

FIG. 8 illustrates part of a V-shaped groove 23 according to the second embodiment. The V-shaped groove 23 has two sides, a top line 24, and two bottom lines 25. Unlike the V-shaped groove 13 of the first embodiment, the bottom lines 25 of the V-shaped groove 23 are both arc-shaped.

Figure 9:
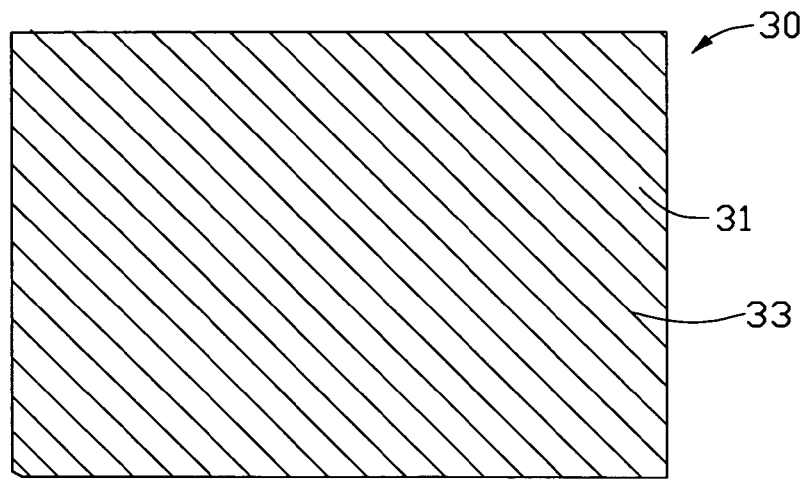
FIG. 9 is a bottom plan view of a light guide plate according to a third embodiment of the present invention.

Referring to the FIG. 9, a light guide plate 30 according to the third embodiment of the present invention is shown. The light guide plate 30 has an incident surface 32 and a bottom surface 31. The incident surface 32 is at a corner of the light guide plate 30. The bottom surface 31 has a plurality of parallel, V-shaped grooves 33. A density of the V-shaped grooves 33 is uniform in a direction away from the incident surface 32.

Figure 10:
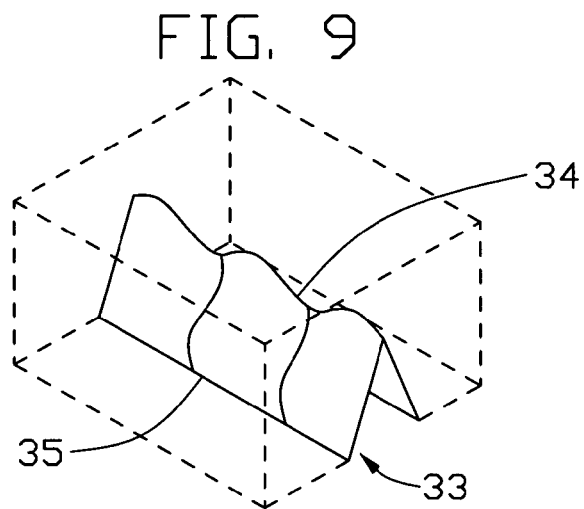
FIG. 10 is a schematic, enlarged, isometric view of part of a V-shaped groove of the light guide plate of FIG. 9.
Figure 11:
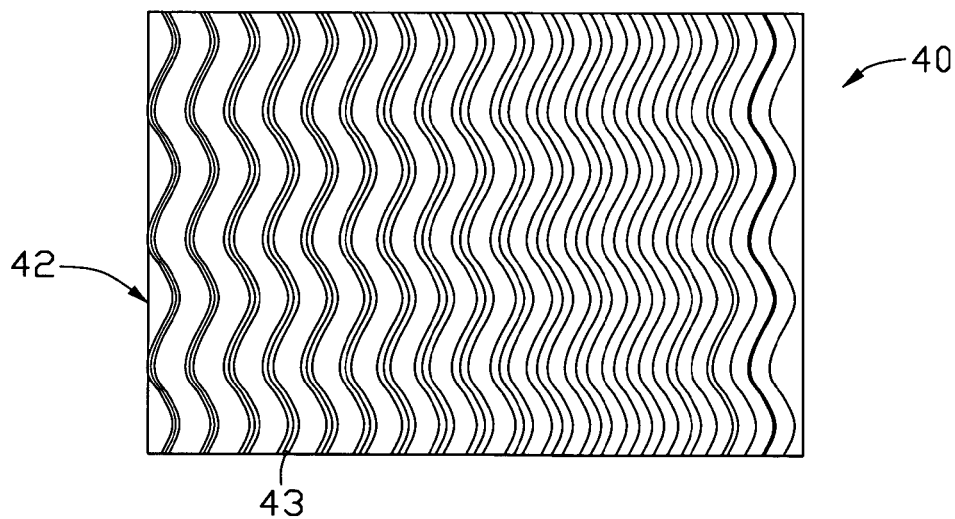
FIG. 11 is a bottom plan view of a light guide plate according to a fourth embodiment of the present invention.

FIG. 10 illustrates part of a V-shaped groove 33 according to the third embodiment. The V-shaped groove 33 has two sides, a top line 34, and two bottom lines 35. Unlike the V-shaped groove 13 of the first embodiment, the bottom lines 35 of the V-shaped groove 33 are both rectilinear.

Referring to the FIG. 1, a light guide plate 40 according to the fourth embodiment of the present invention is shown. Unlike the light guide plate 10 of the first embodiment, an incident surface 42 of the light guide plate 40 is at a main side of the light guide plate 40. A plurality of parallel, V-shaped grooves 43 are provided generally parallel to the incident surface 42. Top and bottom lines (none labeled) of the V-shaped grooves 43 are all wave-shaped. A density of the V-shaped grooves 43 progressively increases in a direction away from the incident surface 42.

Figure 12:
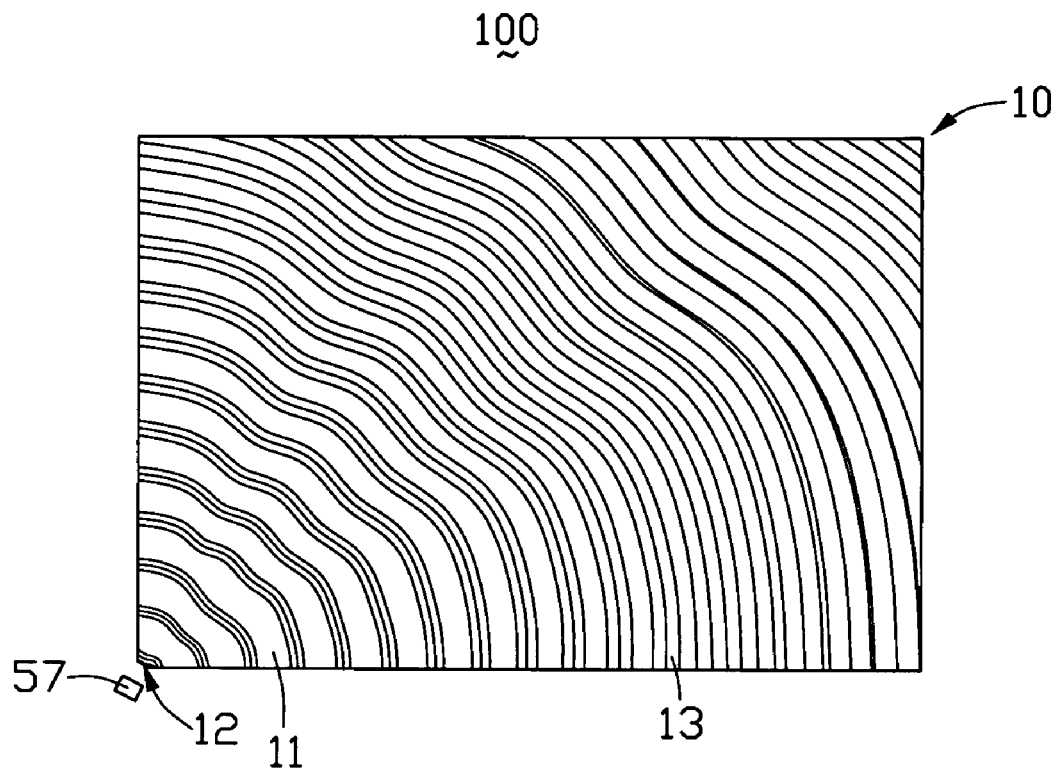
FIG. 12 is a bottom plan view of a backlight module incorporating the light guide plate of FIG. 1.

Referring to FIG. 12, a backlight module 100 using the light guide plate 10 according to the first embodiment of the present invention is shown. The backlight module 100 comprises a light source 57 and the light guide plate 10. The light source 57 is a point source such as a light emitting diode, and is set adjacent the incident surface 12 of the light guide plate 10.

Figure 13:
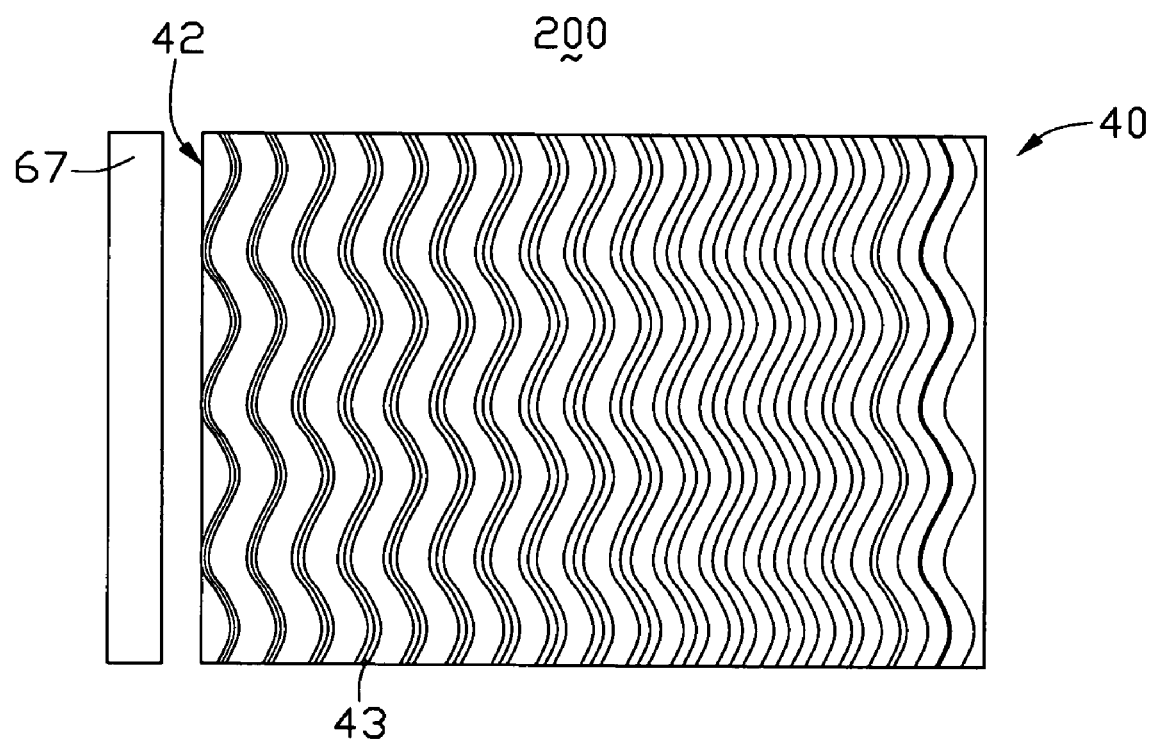
FIG. 13 is a bottom plan view of a backlight module incorporating the light guide plate of FIG. 11.
Figure 14:
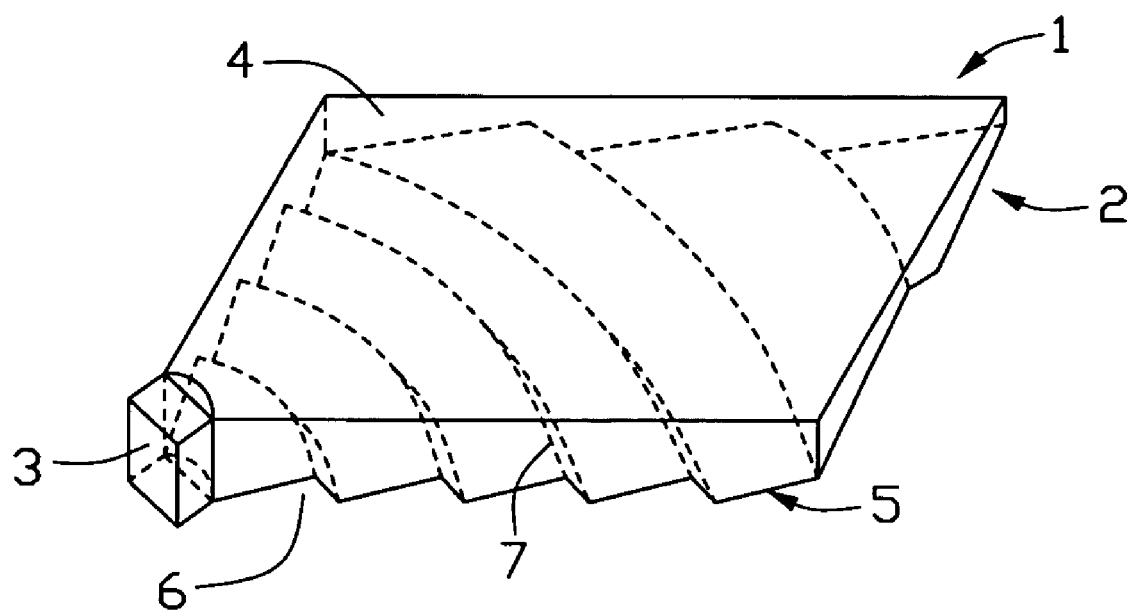
FIG. 14 is a schematic, isometric view of a conventional backlight module.

Referring to the FIG. 13, a backlight module 200 using the light guide plate 40 according to the fourth embodiment of the present invention is shown. The backlight module 200 comprises a light source 67 and the light guide plate 40. The light source 67 is a linear source such as a cold cathode fluorescent lamp, and is set adjacent the incident surface 42 of the light guide plate 40.

It is to be further understood that even though numerous characteristics and advantages of various embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A light guide plate, comprising:
   an incident surface for receiving incident light beams from a corresponding light source;
   an emitting surface; and
   a bottom surface opposite to the emitting surface, a plurality of V-shaped grooves being defined at the bottom surface, wherein a side of each V-shaped groove defines a curved surface, and at least one part of the curved surface is wave-shaped.

2. The light guide plate as claimed in claim 1, wherein each V-shaped groove defines a top line, and the top line is curved.

3. The light guide plate as claimed in claim 1, wherein each V-shaped groove defines two bottom lines, and at least one bottom line is curved.

4. The light guide plate as claimed in claim 1, wherein each V-shaped groove defines two bottom lines, and the bottom lines are rectilinear.

5. The light guide plate as claimed in claim 1, wherein a density of the V-shaped grooves progressively increases in a direction away from the incident surface.

6. The light guide plate as claimed in claim 1, wherein a height of the V-shaped grooves progressively increases in a direction away from the incident surface.

7. A backlight module, comprising:
   a light source, and
   a light guide plate comprising an incident surface for receiving light beams from the light source, an emitting surface, and a bottom surface opposite to the emitting surface, a plurality of V-shaped grooves being defined at the bottom surface, a side of each V-shaped groove defining a curved surface, and at least one part of the curved surface being wave-shaped.

8. The backlight module as claimed in claim 7, wherein the light source is a point source.

9. The backlight module as claimed in claim 8, wherein the light source is set adjacent a corner of the light guide plate.

10. The backlight module as claimed in claim 7, wherein the light source is a linear source.

11. The backlight module as claimed in claim 10, wherein the light source is set adjacent a main side of the light guide plate.

12. The backlight module as claimed in claim 7, wherein each V-shaped groove defines a top line, and the top line is curved.

13. The backlight module as claimed in claim 7, wherein each V-shaped groove defines two bottom lines, and at least one bottom lines is curved.

14. The backlight module as claimed in claim 7, wherein each V-shaped groove defines two bottom lines, and the bottom lines are rectilinear.

15. The backlight module as claimed in claim 8, wherein a density of the V-shaped grooves progressively increases in a direction away from the incident surface.

16. The backlight module as claimed in claim 8, wherein a height of the V-shaped grooves progressively increases in a direction away from the incident surface.

17. A light guide plate, comprising:
- an incident surface for receiving incident light beams from a corresponding light source;
- an emitting surface; and
- a bottom surface opposite to the emitting surface, a plurality of grooves being defined at the bottom surface, a side of each groove defining a curved configuration, and at least one part of the curved configuration being wave-shaped; wherein
- said wave-shaped part extends in either a vertical plane or a horizontal plane relative to said light guide plate.

18. The light guide plate as claimed in claim 17, wherein said grooves are of a V-shaped cross-section.

19. The light guide plate as claimed in claim 18, wherein said wave-shaped part occurs at a bottom edge of the groove.

20. The light guide plate as claimed in claim 18, wherein said wave-shaped part occurs at one of two opposite top edges of the groove.

\* \* \* \* \*